Patented June 29, 1937

2,085,709

UNITED STATES PATENT OFFICE 2,085,709

COMPOSITION FOR COMBATING FOAM

Werner Steibelt, deceased, late of Ludwigshafen-on-the-Rhine, Germany, by Elisabetha Steibelt, administratrix, Ludwigshafen-on-the-Rhine, Germany, assignor to I. G. Farbenindustrie Aktiengesellschaft, Frankfort - on - the - Main, Germany, a corporation of Germany No Drawing. Application July 5, 1932, Serial No. 620,973. In Germany July 25, 1931

6 Claims. (Cl. 252—1)

The present invention relates to a process for combating foam.

It is well known that troublesome quantities of foam are often formed in fermentation processes. In order to destroy the foam as far as possible vegetable fatty oils have been added to the mashes.

It is now found that the formation of foam can be prevented, or that foam can be very readily destroyed by incorporating the mashes used in the fermentation processes with liquefied aliphatic saturated or unsaturated alcohols containing at least 8 carbon atoms. These alcohols are particularly efficient for destroying foam formed during fermentation processes and especially in the production of yeast. It will be sufficient, for example, to bring from 0.5 to about 5 cubic centimeters of alcohol per each square meter onto the surface of a fermenting liquid covered with foam, in order to destroy the foam immediately, whereas, by employment of a tenfold quantity of olive oil, no noticeable effect is attained. Alcohols having more than 8 carbon atoms, such as up to 20 carbon atoms, as for example dodecanol, possess a particularly good efficiency, about 0.8 cubic centimeter of this latter alcohol per square meter of fermenting mash being sufficient in most cases. Other alcohols of the said type are for example octanol, decanol, tetradecanol, hexadecanol, undecenyl and octodecenyl alcohols as well as methyl decyl carbinol and similar alcohols with branched chains.

The alcohols having more than 12 carbon atoms are solid at ordinary temperature and also at the temperature of most fermentation processes; nevertheless, they may be employed, if an eutectic mixture having a low melting point, be produced from two or more of them, such as for example, mixtures of equal parts of dodecanol and tetra- or hexadecanol. They may also be employed simply, or in combination with each other, dissolved in an organic solvent with a sufficiently high boiling point, for example fatty oils or paraffin oil.

It is not necessary to employ the alcohols in a pure state. In many cases, crude mixtures of saturated and/or unsaturated alcohols which may also contain some esters and/or ketones are also suitable, for example, in particular those which are obtained by catalytic oxidation of paraffin waxes or by the reduction of fats or oils of vegetal, i. e. vegetable and animal, origin or of free acids of such materials, whereby it is sometimes advantageous to separate the lower boiling constituents, as for example those which boil up to about 150° C. under a pressure of 15 millimeters, before use.

The following example will further illustrate the nature of this invention, which, however, is not restricted thereto.

Example 5 kilograms of baker's yeast are mixed with 100 litres of a molasses mash, consisting of 4 kilograms of molasses, 0.2 kilogram of ammonium sulphate, 0.03 kilogram of diammonium phosphate and 96 kilograms of water, and kept fermenting, while well aerating and gradually adding further quantities of the mash. After from 10 to 12 hours the whole quantity of the mash finally amounts to 900 litres and that of the molasses consumed to 30 kilograms when the process is finished. Whenever the mass begins to foam, during the process, the formation of substantial amounts of foam is practically completely suppressed by the addition of one or more cubic centimeters of a mixture of equal parts by weight of hexadecanol, tetradecanol and paraffin oil each at the beginning of foaming, 32 cubic centimeters of the mixture of alcohols and paraffin oil being employed during the whole procedure. A yield of 18 kilograms of yeast is obtained after deduction of the initial yeast. The yeast obtained is colorless, odorless and tasteless.

What is claimed is:—

1. A composition for reducing or preventing foam comprising a liquid mixture of a solid aliphatic alcohol containing more than 12 carbon atoms per molecule and a liquid aliphatic alcohol containing at least 8 carbon atoms per molecule.

2. A composition for reducing or preventing foam comprising a mixture of equal parts by weight of hexadecanol, tetradecanol and paraffin oil.

3. The process for combating foam on the surface of liquids which comprises incorporating such liquids with a liquid mixture of a solid alcohol containing more than 12 carbon atoms per molecule and a liquid aliphatic alcohol containing at least 8 carbon atoms per molecule.

4. The process for combating foam on the surface of liquids which comprises incorporating such liquids with a mixture of equal parts by weight of hexadecanol, tetradecanol and paraffin oil.

5. A composition for reducing or preventing foam comprising an eutectic mixture having a low melting point of at least two solid aliphatic alcohols each of which contains more than 12 carbon atoms per molecule.

6. The process of combating foam on the surface of liquids which comprises incorporating such liquids with an eutectic mixture having a low melting point of at least two solid aliphatic alcohols each of which contains more than 12 carbon atoms per molecule.

ELISABETHA STEIBELT.
*Administratrix of the Estate of Werner Steibelt, Deceased.*